United States Patent [19]

Haubner et al.

[11] Patent Number: 4,594,572
[45] Date of Patent: Jun. 10, 1986

[54] OPTICAL MULTIPLE OUTPUT DISPLAY SYSTEM, PARTICULARLY FOR AUTOMOTIVE DASHBOARDS

[75] Inventors: Georg Haubner, Berg; Hartmut Zöbt, Fürth; Hans Petermann, Nuremberg, all of Fed. Rep. of Germany

[73] Assignee: Robert Bosch GmbH, Stuttgart, Fed. Rep. of Germany

[21] Appl. No.: 445,427

[22] Filed: Nov. 30, 1982

[30] Foreign Application Priority Data

Dec. 12, 1981 [DE] Fed. Rep. of Germany ....... 3149291

[51] Int. Cl.⁴ .......................... G08B 19/00; H04Q 9/00
[52] U.S. Cl. .................................. 340/52 F; 340/715; 340/802; 340/800
[58] Field of Search .......... 340/52 F, 752, 753, 340/754, 800, 801, 805, 815.12, 802, 715, 825.17, 825.57

[56] References Cited

U.S. PATENT DOCUMENTS 4,442,424  4/1984  Shirasaki et al. ................. 340/52 F
4,459,591  7/1984  Haubner et al. .

FOREIGN PATENT DOCUMENTS 1427133  3/1976  United Kingdom .
1494240  12/1977  United Kingdom .

OTHER PUBLICATIONS

Microprocessors, Theory and Applications, Second Edition, Gene Streitmatter/Vito Fiore, pp. 9, 37, 47, 52 through 57, 113, 163, and 221.

*Primary Examiner*—Marshall M. Curtis
*Attorney, Agent, or Firm*—Frishauf, Holtz, Goodman & Woodward

[57] ABSTRACT

To provide for optical indication of output values relating to the operating conditions, or other parameters for display on the dashboard of a display panel, for example on automotive vehicles, a display panel (10) has a plurality of indicating blocks (15a . . . 15k) distributed thereover. A logic circuit, for example provided by a micro-processor (12) supplies data over data busses (21, 41) to the respective indicating blocks, which can be connected in series (FIGS. 2, 4) or in parallel (FIGS. 5–7). The logic circuit is connected through suitable connecting lines (13) with sensor inputs, providing ambiant, or operation or operating data. The logic circuit, additionally, generates data of its own, for example time outputs. The indicating blocks each include a shift register (17, 18, 50) which is connected to a data line, the stages of the shift register being connected to respective indicating elements (16, 53) which, together, formed the indicating blocks—for example LCD elements—so that the shift state of the respective shift register will provide suitable output indications. For example, if a shift register has eight positions, and four sequential positions have a 1-signal and four other sequential positions have a zero-signal, a line can be displayed representative of half-full state of a fuel tank.

14 Claims, 7 Drawing Figures

OPTICAL MULTIPLE OUTPUT DISPLAY SYSTEM, PARTICULARLY FOR AUTOMOTIVE DASHBOARDS

The present invention relates to a optical display system, and more particularly to a display system in which a plurality of parameters relating to different operating, or operation or other conditions are to be displayed on a small surface, the perimeters being derived from sensors positioned at widely dispersed locations, and more particularly to such a display system suitable for automotive use to display the customary information on the dashboards of automotive vehicles, without requiring a multiplicity of connecting cables from the respective sensors to display elements.

BACKGROUND

It has previously been proposed to provide an electronic display of outputs indicating the state of various sensors, or numerical values representative of measured operation, or operating conditions, or of other parameters to be indicated, for example clock time. In one such arrangement—see U.S. Pat. No. 3,988,730, Valker (to which German No. 25 55 828 corresponds),—a ring counter is provided for cyclicallyinterrogating various sensors distributed within a motor vehicle. The sensors measure conditions, and parameters occurring within the vehicle and provide corresponding electrical output signals. The measured values, as represented by the output signals are then applied in the form of electrical control signals, in time sequence, over a logic circuit to a plurality of light emitting diodes (LEDs), in order to provide an optical indication of the state or condition of the various apparatus and devices monitored by the respective sensors.

The system as described requires a separate control conductor or line for each one of the LEDs from the centrally located logic circuit. It is only possible to sense values with this circuit which signal a binary state, that is, ON or OFF. Continuous variable parameters, such as, for example, speed, fuel level in a fuel tank, and the like, cannot be indicated with this circuit arrangement.

THE INVENTION

It is an object to improve an electronically controlled display system with multiple outputs in which the number of control lines is substantially less than the number of indicated parameters or conditions, and which, additionally, permits indication of values which are continuously changeable, permitting, if desired, an analog output to a display which is readily evaluated, due to its similarity with familiar customary display arrangements.

Briefly, electro-optical indicators, such as light emitting diodes, or, preferably, liquid crystal display (LCD) elements are used; the LCD elements are controllable by binary signals and combined to form indicators, for example of customary shape, such as a dial for vehicle, or engine speed, or a column, or scale, indicating fuel tank filling, oil pressure or the like. Each indicator has associated therewith a shift register and, preferably, forms a structural unit combined with the shift register. A single control cable, which may include only an energizing connection, a clock connection and a control connection is provided, connecting a logic circuit to the shift registers, the logic circuit being so arranged that it provides a sequence of pulses forming an information pulse train to the shift registers, the shift registers being connected, for example by pin decoding, to decode respective addresses, to associate pulses of the pulse train with the respective shift register and other pulses, within the pulse train, with the information to be displayed. If the information, for example, is other than ON/OFF, the information portion of the pulse train may include a plurality of digits which, each, energize respective elements of the LED to provide a visual indication in form of a clock face, a scale, or the like.

In accordance with a feature of the invention, the shift registers may be serially arranged; in accordance with another feature of the invention, they can be connected in parallel.

The system has the advantage that the measured values are provided in the form of electrical signals in cyclical sequence on an information line, which need be only a single information cable or the like, to be there received and applied over output stages, which may include amplifiers, to the respective indicating elements, formed by the LCD elements. The logic circuit can be easily constructed from commercially available microcomputer components. The inputs can be connected to respective sensors as required, directly, if the sensors provide digital output, or via analog/digital (A/D) converters. The number of output indicators, that is, the LCDs can then be arranged in compact form on the dashboard, or on a console of a vehicle, without requiring a multiplicity of control lines, or a cable harness for the display structure itself. Thus, the central logic circuit can be located where it is convenient and close to the sensors, or at least close to most of them, so that the sensor-logic circuit connections can be kept as short as possible to prevent stray noise signals from being picked up; and, reducing the number of bundled or cabled control lines to the display elements prevents mutual interference due to stray coupling, the elimination of which introduces costs in the cabling arrangement.

In accordance with a preferred feature of the invention, all the display units, together with their shift register, output amplifiers and display elements are located on a suitable display disc, or display panel for installation in the dashboard, or on a console of the vehicle. The display units themselves can be connected to conductive tracks or paths, for example formed on a display panel, or a printed circuit (PC) board located immediately therebehind, for connection to a simple 3-wire cable which merely supplies operating power, clock pulses for synchronization, and data pulses.

The system is not limited to displaying data derived from sensors or otherwise generated, for example time or clock information, in vehicles; it is equally applicable to other structures and apparatus and particularly suitable in installations in which a plurality of sensors are located comparatively closely together, each sensing parameters which are to be indicated remotely from the sensors. In such installations it is desirable to avoid the necessity of having many parallel-placed connecting lines from the sensors to a remotely located display; rather, the invention is equally applicable where such sensors are to be connected to a display structure over as few lines as possible, and in which the display structure, itself, may require miniaturization or has to be fitted into a small space.

DETAILED DESCRIPTION

Figure 1:
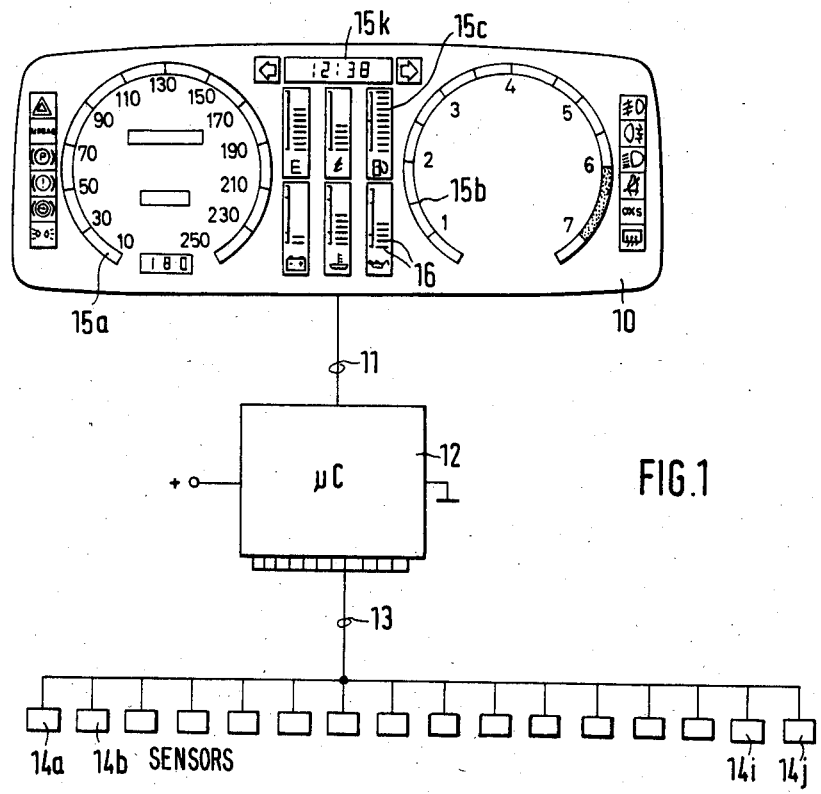
FIG. 1 is a general block diagram of the system having a display panel displaying information frequently used in passenger vehicles.

A display panel 10 located, for example, on the dashboard, or on a console of an automotive vehicle is connected over a multi-strand or multi-bus cable 11 to a micro-computer 12. Preferably, the display panel 10 is located behind the steering wheel of an automotive vehicle, within the range of vision of an operator of the vehicle. The micro-computer 12 has its input connected to a cable 13, or to separate connecting lines, each of which is connected, for example, to one of a plurality of sensors 14a, 14b . . . 14i, 14j.

The display panel 10 is divided into a plurality of indicating blocks 15a, 15b, 15c . . . 15k. As can be seen, the indicator 15k provides an output indication not derived from a sensor; the indicator 15k can, for example, indicate time, day of the week or month, and the like—data derived directly from the micro-computer 12 in accordance with well known time, watch and clock circuitry. Each one of the display blocks 15a, 15b . . . 15k is formed of one or more indicating elements 16. The elements 16 are so arranged that they are capable of combining one or more parameters, or values to be indicated. The respective indicating blocks 15a, 15b . . . 15k are associated with output and amplifying stages, which are combined with the indicating elements 16, and positioned at the backside of the display panel 10. They may, for example, be physically secured to a suitably formed printed circuit (PC) board. To indicate the continuously variable parameter, a plurality of indicating elements 16 are located adjacent each other to form a combined indicating block, for example blocks 15a, 15b, 15c and the like.

Figure 2:
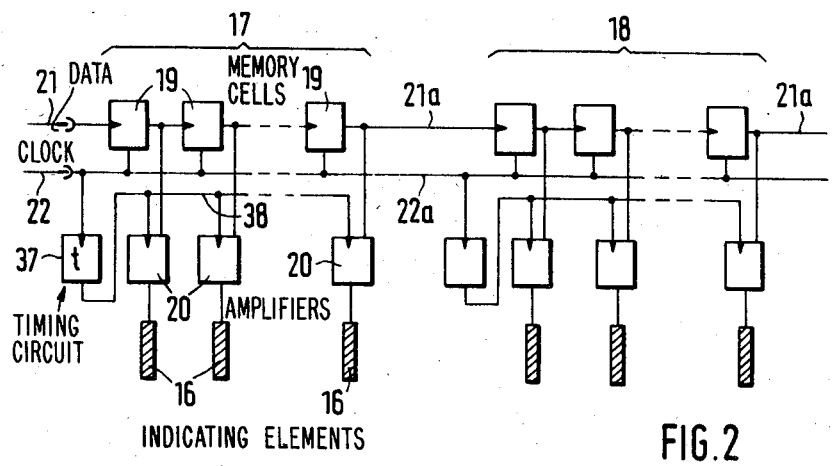
FIG. 2 is a schematic diagram of the indicating units, and their connection, connected to a clock bus and to a data bus.

FIG. 2 shows the indicating elements 16, each of which have a respective output amplifier 20 associated therewith. The indicator elements 16 of the respective indicating blocks have associated therewith shift registers 17, 18, which have respective storage, or memory cells 19. The cells 19 are connected to the respective output amplifiers 20 which, in turn, are connected to the indicating elements 16. The amplifiers 20 include an input memory stage and a self-oscillating transfer-clocking stage for connection to the LCD elements. The output amplifiers 20, each, supply one indicating element 16.

The panel 10 has conductive tracks, or printed circuits on its backside, on which the respective indicating blocks 15a . . . 15k are connected together, as well as to a source of supply voltage. Conductive paths or tracks 21a, 21b interconnect the respective shift registers 17, 18 of the respective blocks 15a, 15b . . . 15k; the first one in the line of connection is connected to a data or information bus 21 and to a clock bus 22. Data bus 21 as well as clock bus 22 form part of the cable 11 (FIG. 1), connecting the micro-computer 12 and the display panel 10. The clock bus 22 is connected, in each indicating block 15a . . . 15k with the input of a timing circuit 37, the output of which is connected to a transfer or "indicate" line 38, connected to the control inputs of the output amplifier 20.

Figure 3:
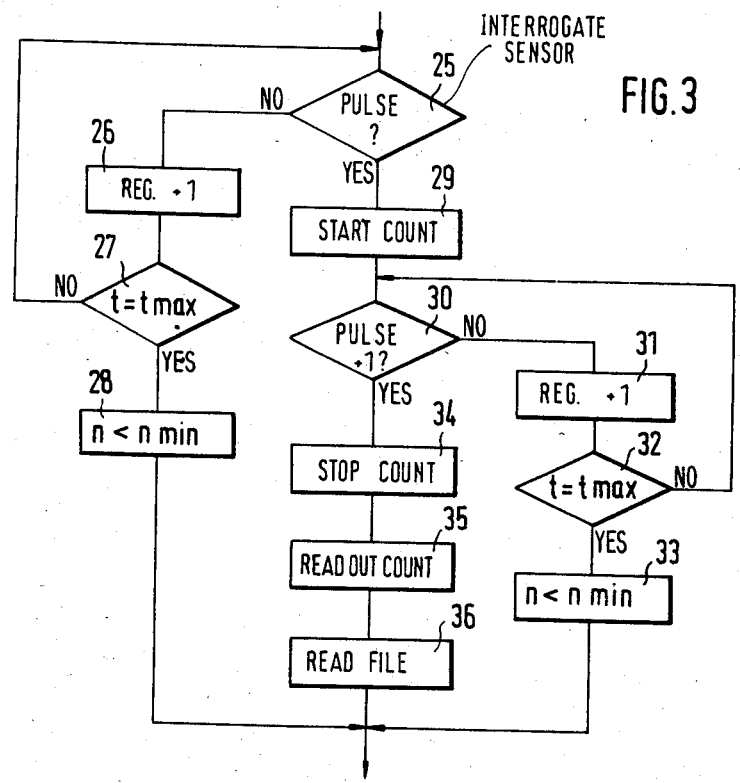
FIG. 3 is a flow diagram of a micro-computer, utilizing for illustration, sensing and indication of engine speed, to be displayed on an engine tachometer display portion of the display panel of FIG. 1.
Figure 4:
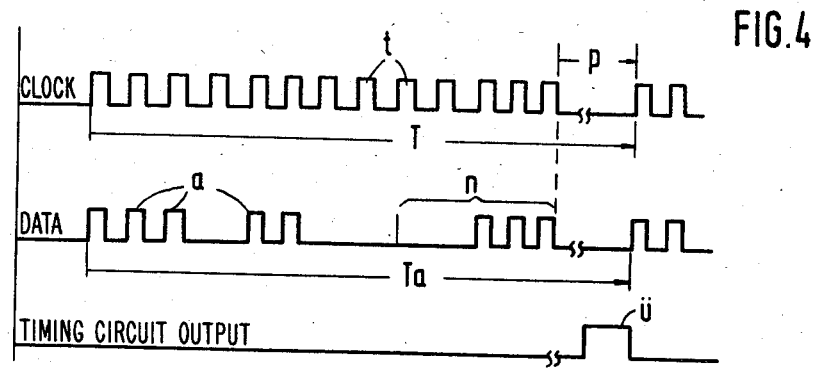
FIG. 4 is a timing diagram illustrating the pulse cycles on the clock bus and the data bus, respectively, and other pulses arising in the system.

Operation—with reference to FIGS. 3 and 4

The operation of the system will be described in connection with an example, in which output of engine speed, to be displayed on an engine speed tachometer 15b has been choosen as the respective parameter. Display of other parameters will then be obvious, in analogy to the examples to be described.

The sensors 14a . . . 14j each measure or sense an operation, or operating, or ambient parameter, for example oil pressure in the engine, state of fuel in the fuel tank, engine temperature, ambient temperature or the like. FIG. 3 illustrates the flow diagram of the program to be carried out by the micro-computer 12, applied to measuring engine speed, and displaying a representative output on the display block 15b.

Let it be assumed that sensor 14b is a sensor coupled to provide output pulses upon rotation of the engine. Such a sensor may, for example, be an inductive sensor which provides output pulses of a frequency depending on engine speed, and electromagnetically coupled to the starter gear of the engine, thus rotating in synchronism with the engine upon rotation thereof.

In a first program step 25, the sensor 14b is interrogated. Depending on engine speed, the sensor provides an output signal of frequency with changes in proportion to engine speed. If no speed pulse is sensed at the time of interrogation, a shift register is incremented by 1 in the program step 26. A subsequent program step 27 then tests whether the register count t has reached a predetermined maximum value $t_{max}$. If not, the program steps 25, 26, 27 are cycled until the value $t_{max}$ is reached. When the value $t_{max}$ has been reached, the condition of no pulses derived therefrom is shown, i.e. speed zero. This terminates the program with respect to the particular sensor, and the computer then switches to interrogate the next sensor, for example 14c.

Let it be assumed, next, that the engine has been started and that, rather than providing an output signal in step 28 of zero, the sensor 14b did provide a pulse. If so, program step 29 starts a speed counter. Step 30 tests if a further pulse is received from sensor 14. If not, the program is branched to step 31 incrementing a counter register by 1. Step 32 tests the count state of this counter register. The program loop of steps 30, 31, 32 is continued until, when the register of step 31 has reached its predetermined count value $t_{max}$, program step 33 provides a minimum value of one. This indicates that the engine has not yet exceeded a desired idling speed. If, however, upon repeated cycling of the loops 30, 31, 32, a new speed pulse is received, step 34 stops the speed counter, and in step 35, the count state of the counter is read out. The count state which is read out is representative of the time between two sequential speed pulses. The count state, thus, is directly inversely proportional to engine speed. Program step 36 interrogates and reads a file or table, for example stored in a read-only memory (ROM), in the microcomputer 12 which relates the count of the tachometer counter to an indicated speed, which then will be provided in form of a pulse group n of a pulse train Ta and applied to a data bus 21.

All other signals can then be processed in similar manner, that is, signals derived from the respective sensors 14a, 14c . . . 14j, and provided within the pulse train Ta on the data bus.

The clock pulses t on the clock bus 22, and the indicating pulses a on the data bus 21 are shown in FIG. 4. Both pulse trains are simultaneously applied to the indicating blocks 17, 18 over the respective clock bus 22, and the internal connections 22a as well as the data bus 21, and the internal connections 21a . . . . The accuracy of the speed indication, and speed measuring, as well as the display can be determined by the number of the indicating elements 16 within the indicating block 15b. Let it be assumed, for example, that the indicating block 15b includes 14 indicating elements 16, each one, for example, representative of 500 rpm of the engine. FIG. 2 illustrates the first two and the last indicating elements 16.

The indicating block 15 can, likewise, indicate vehicle speed, controlled in similar manner by the shift register 18.

Upon beginning of each pulse train T on the clock bus 22, the indicating pulses a on the data bus 21 are read into the first shift register 17 and are shifted on by further clock pulses t into the subsequent shift register 18, as well as into further shift registers, which are serially connected therewith. The last clock pulse t of the clock pulse sequence on the clock bus 22 thus indicates that all indicating pulses a are read into the registers. The portion n of the pulse sequence Ta indicating engine speed is now in register 17. The three pulses in the portion n may indicate, for example, a speed of 1,500 rpm, that is, three elements 16 are to be energized, each representing a speed of 500 rpm. These three pulses set the two left memory cells 19 within the shift register 17 and a third, not shown. At the end of the pulse sequence T, an extended pulse pause p will occur. This pause is sensed by the timing circuit 37 (FIG. 2). Timing circuits 37 are associated with each indicating block. After elapse of the timing interval, the output of the timing circuit 37 will provide, just before the pause p has terminated, a "display" or "indicate" transfer pulse ü, which is applied over the line 38 to the output amplifiers 20, thus energizing, or opening the output amplifiers and output signals are now connected from the memory cell 19 (FIG. 2) of the shift register 17 into the output amplifiers 20. The output amplers 20, preferably, are constructed as flip-flop (FFs) and thus, inherently, include memory. The pulses read into the output amplifiers 20 are immediately applied to the indicator elements 16. Consequently, the indicator block 15b will have the two lowest—as well as one more—LCD elements 16 connected, thus indicating an engine speed of 1500 rpm. When the pulse pause or gap p on the clock bus 22 is terminated, the timing stage 37 is reset, and the inputs of the output stages 20 are again blocked.

In a subsequent clock pulse train T on the clock pulses 22, a further pulse train Ta is shifted via the information bus 21 into the shift registers of the indicating blocks 15a . . . 15k. Since all the shift registers of the indicating blocks 15a . . . 15k are serially connected, the program of the micro-processor 12 is so selected that, with the start of the pulse pause p on the clock bus 22 all shift registers will have the respective values, measured by the sensors 14a-14j, in form of binary information, in the output of the memory cells 19 of the respective shift registers. During the pulse pause p, they are read into the output stages 20 by the transfer, or "display" or "indicate" pulse ü, for indication on the respective indicator elements 16.

The pulse sequence Ta on the data bus 20 is shifted into the indicator elements 16 with a cycling time of 0.1 s, for example similar to that in a serial-parallel converter. Since the program of the micro-processor 12 can operate at high cycling frequency, values sensed by sensors 14a–14j which change, even rapidly, are rapidly indicated, so that the operator will have displayed on the display panel 10 current information with negligible delay with respect to the actual measuring thereof. The delays are negligible with respect to the inertia of mechanical measuring components.

In the foregoing description, the shift register 17 was considered to be associated with the display block 15b. Actually, and as explained above, the information derived from the first sensor—assuming interrogation in numerical sequence—will be displayed in the display block which is associated with the shift register which is the last one of the chain. The sensor 14a can be the first one which is interrogated, e.g. providing output indication of vehicle speed. The sensor, for example, may be responsive to wheel speed, or transmission output speed. The display block 15a then will have to be connected at the last one of the chain of shift registers 17, 18 . . . since the data on the data bus 21 relating to the other sensors will be shifted, sequentially, to preceeding shift registers and not until all the shift registers are full, will a final "display" or "indicate" transfer pulse H be provided.

Figure 5:
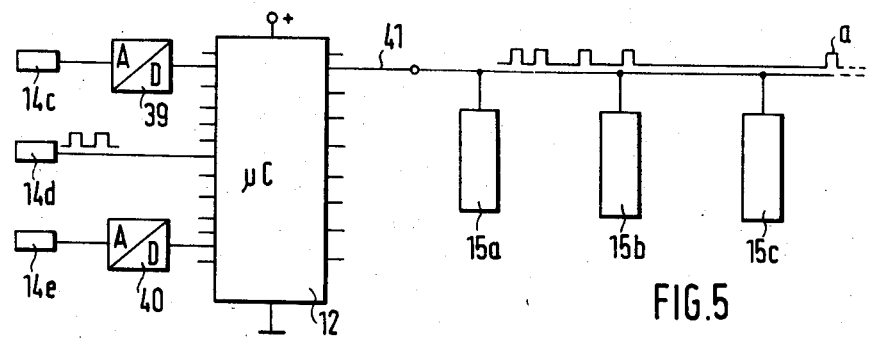
FIG. 5 is a schematic diagram of another embodiment of the invention in which the display elements of respective parameters are connected in parallel.
Figure 6:
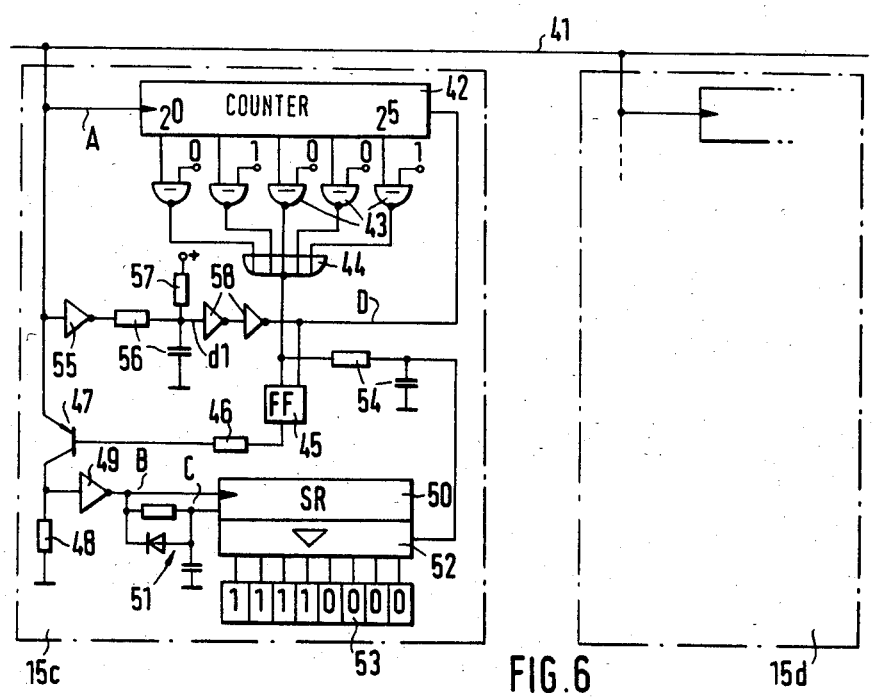
FIG. 6 is a circuit diagram of a display block of FIG. 5.
Figure 7:
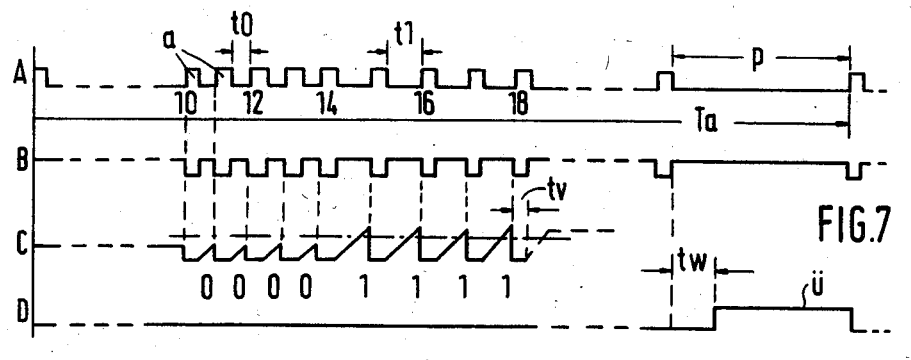
FIG. 7 is a pulse diagram indicating the pulse trains at various circuit junctions of the block of FIG. 6.

Parallel readout, with reference to FIGS. 5–7

The example selected to illustrate parallel readout will be providing an output indication of the fuel level in the fuel tank of the vehicle. The fuel level sensor, for example sensor 14c (FIG. 1) provides an analog output signal representative of the fuel level in the tank of the vehicle. This signal is applied over A/D convertor 39 to one input of micro-processor 12. Input 14d, providing output signals representative of vehicle speed is directly coupled to the input of the microprocessor 12. A further sensor 14e, for example providing output information about engine temperature likewise is connected through an A/D convertor 40 with a further input of the micro-processor, or micro-computer 12. Other sensors 14a, 14b, 14f . . . 14j have been omitted from FIG. 5 for clarity in the drawing. These other sensors can provide such other parameters as are customary in motor vehicles. The output of the micro-processor 12 is connected over only an information bus 41 with the indicator 15a . . . 15k on the display panel 10. The indicator blocks are, additionally, connected to a power supply bus, not shown, and standard in displays of this type. The shift registers of the indicating blocks 15a–15j are connected, in parallel, to the information bus 41. The pulse train Ta—see FIG. 7—has clock pulses a with short pauses t0; longer pulse pauses t1, and a much longer pulse gap p to synchronize the display blocks.

The circuit structure of a display block is shown in FIG. 6, in which the display block 15c to show filling state of the vehicle tank is shown. Let it be assumed that the tank is half full.

The circuit includes a five stage binary counter 42, the input of which is connected to the data bus 41. The five outputs are connected to respective input terminals of 5 EXCLUSIVE-OR gates 43. The other terminals of the five EXCLUSIVE-OR gates 43 are connective, by pin coding, to respective zero and one level terminals, the levels of which are derived with respect to the supply voltage, in accordance with a suitable voltage operation of the respective components, as well known. The EXCLUSIVE-OR gates 43 have their output connected to an NOR gate 44, the output of which is connected to the SET input of a FF 45. The output of the FF 45 is connected to a resistor 46 and with a base of a pnp transistor 47, the emitter of which is connected to the data bus 41. The collector of transistor 47 is connected over a resistor 48 to ground, or chassis and, further, over an inverter 49 to the clock input of an 8-stage shift register SR) 50. The output of inverter 49 is connected to a timing circuit 51, formed by a resistor, a diode and a capacitor, the output of which is connected to the data input terminal of the shift register 50.

The parallel output terminals of the 8-stage shift register 50 are connected to one or more output amplifiers 52, the outputs of which are connected to eight LCD indicating elements 53. The output of the NOR gate 44 is, further, connected over a timing circuit 54, formed by a R/C circuit with the control input of the output amplifier 52. The indicating block is synchronized by an inverter 55, connected to the data bus 41, the output of which is connected over a further R/C timing circuit 56. The output of the timing stage 56 is connected over a resistor 57, connected to positive voltage and over two inverters 58 to the RESET inputs of the FF 45 and of the binary counter 42.

Operation

Let it be assumed that the fuel level indicator 15c has eight indicating positions between full and empty. Pulse or signal processing occurring at various lines, junctions or points within the circuit of FIG. 6 are indicated by capital letters, the respective signals or pulses being shown on the respective graph lines A–D of FIG. 7.

The pulse train Ta on the data bus 41, cyclically generated by the micro-computer 12 appears as point A at the input of the binary counter 42. Each pulse a causes the binary counter 42 to shift by one count state. The coding of the EXCLUSIVE-OR gate 43 (FIG. 6) then will determine that only the 18th pulse on the data bus 41 can switch the EXCLUSIVE-OR gate 43 and enable the NOR gate 44 to change from a low, or for example, zero level to a high, or for example H, or one-signal level, causing the FF 45 to SET. Consequently, only the 18th pulse applied to the transistor 47 by the FF 45 will cause a transistor 47 to block. All pulses which had occurred before the 18th pulse were applied through the transistor 47 from the data bus 41 to the inverter 49. At point B of the circuit, the pulse sequence illustrated in graph B of the shift register 50 will appear. The timing circuit 51 measures the pulse width of the pulses at the point B, that is, discriminates between the pulse gaps t0 and t1 of the pulses a on the data bus 41. The pulse train at point C of the circuit at the output of the timing circuit 51 then will show that, at short pulse gaps t0 on the data bus 41, the timing circuit 51 provides a zero-signal to the information input of the shift register 50; if the gaps are longer, however, as shown by the gaps t1, 1-signals are provided. This information is entered into the shift register 50.

At the beginning of the 18th pulse on the information bus 41, the four first or forward memory cells of the shift register 50 will have the four 1-signals entered therein; the four trailing, or rearward memory cells will store the zero-signals. The FF 45 will block the transistor 47 and, after a time delay tv, as determined by the timing circuit 54, a transfer pulse will be applied to the output amplifiers 52. The output amplifiers 52 will read out the content of the shift register 50 which is stored in the output amplifiers 52 as is applied to the indicating elements 53. The four lower indicating elements 53 in the indicating block 15c in FIG. 1 will then have an output indication, representative of half full state. The synchronization pause p will occur towards the end of the pulse train ta, which is sensed by the timing stage 56. A low, or zero-signal will occur at the output of the inverter 55 during this time, so that the timing stage 56 can switch-over the inverters 58 during this timing interval. At the output of the inverters 58, at point D of the circuit, and after the time delay tw, a transfer pulse ü will occur which RESETS FF 45 as well as the binary count of 42. Upon occurrence of a new pulse train Ta, the cycle will repeat.

The remaining indicating blocks—see FIG. 1—are similarily constructed. The EXCLUSIVE-OR gates 43 are suitably pin-coded, which insures that each indicating block can apply only a predetermined portion n of the pulse train Ta on the data bus 41 on the indicating elements 53. By coding of the count of the count output to count 18 in the indicating block 15c the eight preceedingly occurring pulse pauses are evaluated and applied to the output amplifiers 52 with the 18th pulse over the shift register 50 to provide indication by the indicating elements 53 of the information within the shift register 18.

In an adjacent indicating block, for example block 15, the output of the binary counter can be coded to the number 26. Similarily, if the shift register 50 likewise has eight positions, the eight pulses before the 26th pulse will have been read into the shift register corresponding to shift register 50. These eight pauses are evaluated as a further operating, or operational or environmental parameter and can be applied to the indicating elements 53 of the indicating block 15d.

The binary counter of the blocks 15a . . . 15k will, sequentially, in time, interrogate the respective shift registers 50, and read-out the content thereof; the pulse gap or pause p on the information bus 41 provides for simultaneous reset and synchronization.

Use of a micro-computer or micro-processor as a central logic circuit enables inclusion of conversion tables for respective sensors, which are standard equipment in any vehicle, in form of a ROM. Conversion tables, files and the like for sensors which are accessories, or selectively applied to specific vehicles can be included in form of one or more EPROMs (erasable programable read only memories) or random access memories with a background memory. These tables or files can then be changed, or reprogramed for selective installation in specific vehicle types, or changed in accordance with the sensors installed in the respective vehicle.

One indicating block can indicate more than one ambient perimeter. For example, block 15k can indicate time, as well as the state of direction signals. For standard application, the display panel 10 should show vehicle speed, odometer, fuel, oil pressure, engine temperature, battery charge condition. Additionally, warning flasher operation, high or low beam of headlights, direction signal indication, hand brake ON and seat belt lights should be monitored. Additional, and selectively used indications such as engine speed, parking lights ON, air bag system ON, lamp operation, and the like then can be connected, as desired.

The data bus and the clock bus, or either of them need not be an electrical conductor, but may be a light guide. If so, optocouplers must be used to transduce the signals between optical and electrical characteristics. Sensors for fuel tank content, engine temperature and the like which have a wide measuring range can be connected directly to the input of the micro-processor or micro-computer if the micro-processor or micro-computer has internally A/D conversion capability, or example by having A/D transducer integrated therein. The micro-computer can additionally provide indication data which go beyond standard or basic indication by pin-programing of the memory. The micro-processor can be located in any suitable position in the vehicle, and preferably should be placed at a location where the connecting lines to the respective sensors are of minimum length.

The shift registers, counters and output amplifiers of the respective indicating blocks are secured to the back-side of the display panel 10 at a position which is not externally visible, and electrically connected to circuit paths or tracks, for example on a PC board. This results in a flat display panel, requiring very little rear room, and thus increases the space available at the front seats of the vehicle.

It may be desirable, particularly from the point of view of stocking of replacement parts or for repair, to subdivide the display panel 10 into smaller display units, which are connected together into a single larger display unit, for example by plug-and-socket connections, which connect power supply, as well as the data and clock busses, and provide a secure ground or chassis connection as well.

Various changes and modifications may be made and features described in connection with any one of the embodiments may be used in the other, within the scope of the inventive concept.

Some of the output sensors, for example sensor 14b may have a wide range of sensing indication, and include a substantial number of sensing elements, for example the tachometer may have 16 or more indicating elements. Other of the sensors, however, may provide output signals which only require a binary indication, for example that oil pressure is either in order, or below required level. The capability of the counter 42 (FIG. 6), and the number of pulses in the pulse trains Ta can be extended to accommodate more sensors, or a finer subdivision, for example by making the counter 42 a six, seven, or even eight stage counter and extending the pulse train Ta accordingly. The counter 42 with five stages, and counter 50 with eight stages has been shown for purposes of illustration.

A suitable element for the micro-processor 12 for use in the embodiment of FIGS. 2-4 is: Motorola MC 685 R2. A suitable micro-processor 12 for use in the embodiment of FIGS. 5-7 is: NS COP 311. A suitable amplifier 20 (FIG. 2) is: NS HLCD 04 37.

All other circuit structures, components and elements are well-known and can utilize commercially available components.

We claim:

1. A low-interference multiple output optical display system with reduced cabling requirements, and thereby reduced exposure to electrical noise and crosstalk, to display values relating to the operation of a dynamic apparatus, particularly a motor vehicle, indicating operating parameters and conditions of the vehicle and its components, having electro-optical indicator blocks (15a . . . 15k) arranged in fixed positions on a panel (10) to display said values;
a plurality of sensors (14a . . . 14j) providing sensor output signals representative of different respective operating, operation, and condition parameters;
a logic circuit (12) located remotely from said indicator blocks but in close proximity to said sensors, connected to and receiving said sensor output signals and providing signals for the indicators in dependence on the values of said sensor output signals,
wherein
each indicator block (15a . . . 15k) includes a plurality of indicator elements (16, 53) which are controllable by binary signals, the plurality of indicator elements of any one indicator block being combined to provide an output display of a selected operating condition parameters, and a shift register (17, 18; 50) in each indicator block and forming a structural unit therewith;
a single control signal conductor (21, 41) is provided, connecting the logic circuit (12) and at least a plurality of said indicator blocks (15a . . . 15k); and
said logic circuit is connected and arranged to provide a serial pulse train (Ta) over said single conductor (21, 41), forming an information pulse train being applied to said shift registers, said shift registers decoding the data carried by said pulse train, and hence the information forming the values to be indicated by the indicator elements, the indicator elements (16, 53) of the respective indicator blocks (15a . . . 15k) being associated with selected stages of the shift registers.

2. System according to claim 1 further comprising output amplifiers (20, 52) connected between the output of the shift registers (17, 18; 50) and the indicating elements (16, 53) and forming a structural unit with said indicating elements and shift register.

3. System according to claim 1, wherein the indicating blocks (15a . . . 15k) are secured to the display panel (10);
and circuit connections (21a, 22a; 41) are provided, physically connected to the display panel, interconnecting the indicating blocks and said single control signal conductor (21, 41).

4. System according to claim 3 wherein the indicating elements (16, 53) are adjacently located on the display panel to form a continuous indication track.

5. System according to claim 1 wherein the pulse train (Ta) includes a transfer, or "indicate" or "display" pulse (ü) having a characteristic differing from other pulses of the pulse train;
and wherein the shift registers (17, 18, 50) are responsive to the pulses of said pulse train, said transfer pulse transferring the state of the shift registers, as a consequence of the response to the pulses of the pulse train to the indicator elements (16, 53).

6. System according to claim 5 further including amplifiers (20, 52) having memory characteristics connected between the outputs of the shift registers (17, 18, 50) and said indicating elements (16, 53).

7. System according to claim 1 wherein (FIGS. 2 and 4) the shift registers (17, 18) are serially connected;

and wherein the first one of the serially connected shift registers (17) is connected to the data bus (21).

8. System according to claim 7 further including a clock bus (22) the shift registers being serially connected to the clock bus;

the clock bus being connected to the logic circuit (12), said logic circuit providing a clock pulse train (T) including a plurality of clock pulses (t) and a pulse gap (p) having a duration longer than the gaps between sequential clock pulses (t);

and wherein the clock pulses (t) are connected to the shift registers to shift the data pulses within the pulse train (Ta) on the data bus (21) into shift registers.

9. System according to claim 8 wherein each one of the indicating blocks (15a ... 15k) includes a timing circuit (37) connected to the clock bus (22), the timing circuit sensing the pulse gap (p) which is longer than the gaps between the clock pulses (t), and provides a "transfer" pulse to transfer the content within the shift registers to the respective display elements (16).

10. System according to claim 1 wherein (FIGS. 5–7) each indicate a block (15a ... 15k) includes a binary counter (42) connected to the data bus (41);

a decoding circuit (43, 44) decoding the count state of the binary counter;

and a timing circuit (54), the timing circuit responding to different pulse lengths of the data pulses on the data bus (41) and characterizing, respectively, different binary signal levels and entering signals in the shift register (50) in accordance with respectively decoded pulses;

the decoding circuit (43, 44) providing a "transfer" transfer pulse from the fifth register to the display elements (53) for display of the contents of the shift register.

11. System according to claim 10 wherein the shift registers (50) of the respective display blocks (15a ... 15k) are connected in parallel to the data bus (41).

12. System according to claim 11 further including a switching stage (47) connecting the shift register (50) of each indicating block (15a ... 15k) to the data bus (41);

and wherein the switching stage (47) is connected to block application of data pulses to the shift register under control of the decoding circuit (43, 44) when the decoding circuit has decoded a predetermined count state within the binary counter (42), and representative of a particular display block, associated with set count state.

13. System according to claim 12 further including an inverter stage (49) connected to the switching stage (47) and to the clock input of shift register (50);

and a timing circuit (51) decoding the change in pulse duration of the pulses on the data bus and connected to the input of the shift register (50) and receiving the signals from the inverter stage (49) received from the switching stage before the switching stage is blocked.

14. System according to claim 10 further including a long reset pulse gap timing stage (55, 56, 57, 58) connected to the reset input of the binary counter (42) and decoding an extended pulse gap (p) of the pulse train (Ta) to reset the binary counter (42).

* * * * *